July 25, 1967 R. TEMPLE ETAL 3,332,118
SAFETY LINE WITH SAFETY ANCHOR
Filed June 11, 1965 2 Sheets-Sheet 2
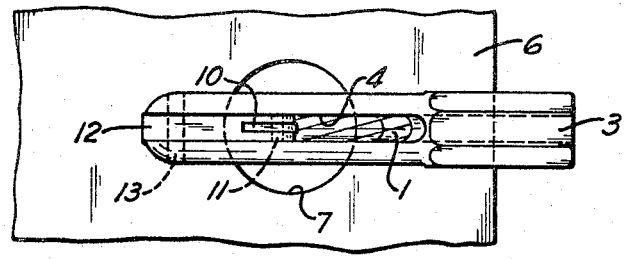
Fig. 4
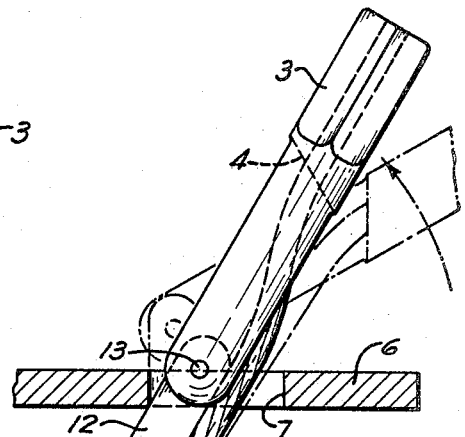
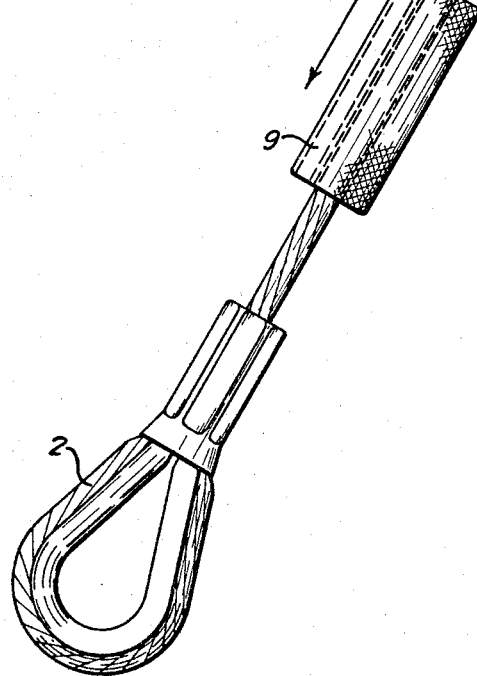
Fig. 3
INVENTORS.
ROBERT TEMPLE
JOSEPH L. GIEBEL
BY
Brown, Critchlow, Flick & Peckham.
ATTORNEYS.

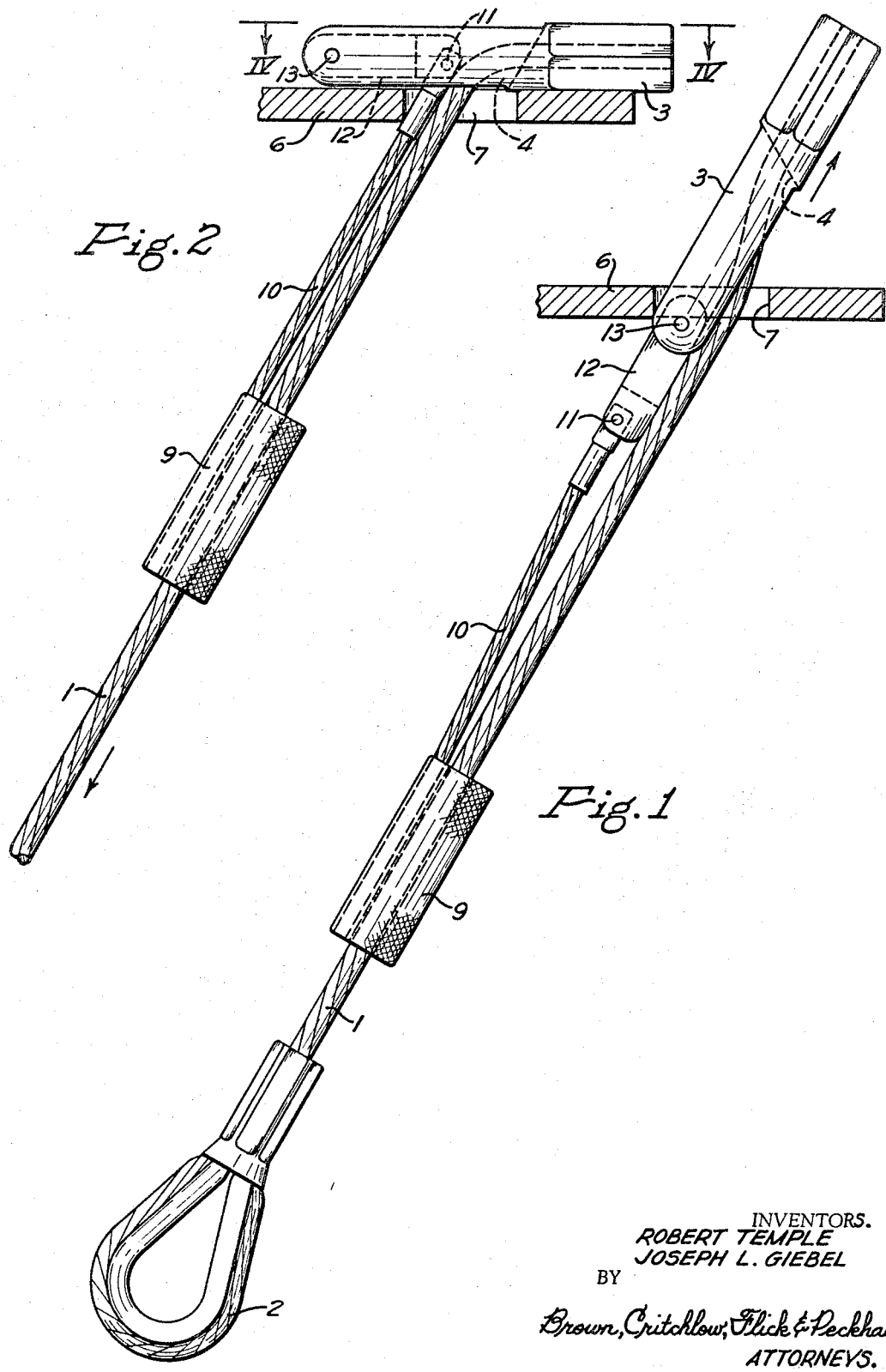

United States Patent Office 3,332,118
Patented July 25, 1967

3,332,118
SAFETY LINE WITH SAFETY ANCHOR
Robert Temple and Joseph L. Giebel, Pittsburgh, Pa.,
assignors to Mine Safety Appliances Company, Pittsburgh, Pa., a corporation of Pennsylvania
Filed June 11, 1965, Ser. No. 463,088
6 Claims. (Cl. 24—123)

This invention relates to safety lines such as are used by window washers and structural steel workers, and more particularly to the way in which such lines are anchored to supports.

It is among the objects of this invention to provide a safety line which can be quickly attached to and detached from a support, which cannot become accidentally disengaged from the support, which can be attached to a support by merely inserting it in a hole in the support, and the anchoring portion of which is simple in construction and operation.

In accordance with this invention a flexible cable is adapted to be connected to a man, such as through a safety belt. The cable has a free end that is secured to an anchoring cross bar, from the central portion of which the cable extends laterally. The bar is adapted to be passed lengthwise with the cable through a hole in a supporting member, after which the bar will extend transversely of the cable and hole to prevent withdrawal of the cable from the hole. A lever at one side of the cable has one end pivotally connected to the adjoining end of the bar. The lever normally extends toward the cable. Mounted on the cable is a slide connected to one end of a connecting member, the opposite end of which is pivotally connected to the free end of the lever. When it is desired to remove the safety line from the support to which it is anchored, the slide is pulled outwardly on the cable in order to cause the connecting member to swing the free end of the lever away from the bar and tilt the adjoining end of the bar toward the cable so that the sleeve can pull the bar lengthwise through the hole in the support and thereby release the safety line from it.

The preferred embodiment of the invention is illustrated in the accompanying drawings, in which:

FIG. 1 is a plan view of our safety line in the process of being anchored to a support;

FIG. 2 is a plan view of the safety line in anchored position;

FIG. 3 is a plan view of the safety line in the process of being released from the support; and FIG. 4 is a side view of the anchoring cross bar, taken on the line IV—IV of FIG. 2.

The safety line may include a flexible cable that is long enough to extend around the back of a man, where it is attached to his safety belt, with anchoring means secured to opposite ends of the cable. Or, two short safety lines may be used, one attached to each side of the safety belt. A short safety line is illustrated in the drawings, in which one end of the flexible cable 1 may be provided with a loop 2 for attachment to a hook or ring on a safety belt (not shown). As shown in FIG. 2, the opposite or free end of the cable is securely attached to a cross bar 3 that is used for anchoring the cable to a fixed support. This short bar projects only an inch or so from opposite sides of the cable. At one side of the cable the bar is tubular and receives the end portion of the cable which extends into it through a lateral opening 4 in the central part of the bar. The cable is anchored in the bar, preferably by compressing or swaging the tubular portion of the bar against it. Most suitably, the cable is provided with a permanent set where it is bent to leave the cross bar.

This safety line can be anchored to a support 6 that is provided with a hole 7, by merely pressing or squeezing the end of the anchoring bar opposite the tubular end toward the cable as shown in FIG. 1 so that they both can be passed lengthwise through the hole. As soon as the cross bar clears the hole, it will return to its position transverse to the cable and extend across the hole and beyond its edge as shown in FIGS. 2 and 4. Whenever tension is put on the cable by the man using it, the bar will be pulled against the back side of the support at diametrically opposite sides of the hole and thereby prevent the cable from being withdrawn from the support. Where this safety line is being used by a construction worker, the support for it can be the flange of a metal column or girder and hole 7 can be one of the bolt or rivet holes with which the flange generally is provided. In the case of a window washer, brackets with holes in them for receiving the anchoring bars can be permanently attached alongside the windows.

Another feature of this invention is that the safety line can be quickly and easily disconnected from its support. Accordingly, a slide, which may be in the form of a sleeve 9, is slidably mounted on the cable. One end of a connecting member, such as a line or flexible element 10, is fastened to the slide in any suitable manner. This connecting member extends along the cable toward the anchoring bar, and the opposite end of the connecting member is pivotally connected at 11 to the free end of a lever 12. The outer end of the lever is connected by a pivot pin 13 to the end of the anchoring bar opposite to its tubular end. It is preferred that the bar be provided with a longitudinal slot for receiving the lever, in which case the slot also forms the opening 4 from which the cable extends laterally away from the bar. In order to pass the cross bar through the hole in the support, the lever must extend away from the bar toward the sleeve as shown in FIG. 1. While the bar is in anchoring position, the lever is in slot 4, with its free end close to the cable.

In order to release the anchoring cross bar from the support, all that it is necessary for the man to do is to move or lean forward enough to release the tension on the cable and then pull the slide 9 outwardly along it. When this is done, the free end of lever 12 is pulled out through the hole in the support, which causes the lever to fulcrum on the edge of the hole and thereby move the adjoining end of the anchoring bar toward the opposite side of the hole. As shown in FIG. 3, this action swings the opposite end of the bar toward a position more nearly in line with the cable so that the bar and cable extend more or less in the same direction to allow the bar to be pulled by the sleeve out through the hole. This releasing operation functions best if the sleeve is given a quick jerk. Such action will tilt the lever end of the cross bar toward the cable and simultaneously yank the bar out through the hole in the support.

One of the big advantages of this safety line is its usefulness for structural steel workers. The structural members with which they work generally are provided with a number of punched or drilled holes for receiving bolts or rivets. Our anchoring bar can readily be inserted in any of those holes to fasten this safety line to a rigid support. No special supporting brackets are required. The anchoring bar likewise can be inserted in and removed from blind holes, such as found in box beams, because the bar is removable by simply pulling on slide 9.

According to the provisions of the patent statutes, we have explained the principle of our invention and have illustrated an described what we now consider to represent its best embodiment. However, we desire to have it understood that, within the scope of the appended claims, the invention may be practiced otherwise than as specifically illustrated and described.

We claim:
1. A safety line for detachable connection to a support provided with a hole through it, the line comprising a flexible cable adapted to be connected to a man and having a free end, an anchoring cross bar, said free end of the cable being secured to said bar and extending laterally from the central portion thereof, said bar being adapted to be passed lengthwise with the cable through said support hole and to then extend transversely of the cable to prevent their withdrawal from the hole, a lever at one side of the cable, means pivotally connecting one end of the lever to the adjoining end of the bar, the lever normally extending toward the cable, a slide mounted on the cable, and a connecting member fastened at one end to the slide and pivotally connected at its opposite end to the free end of the lever, whereby when the slide is pulled outwardly on the cable said connecting member will swing the free end of the lever away from said bar to tilt said adjoining end of the bar toward the cable so that the sleeve can pull the bar lengthwise through the support hole to release the safety line from the support.

2. A safety line according to claim 1, in which said anchoring cross bar is provided at one side of the cable with a longitudinal slot for receiving said lever.

3. A safety line according to claim 2, in which said cable extends laterally out of the inner end of said slot.

4. A safety line according to claim 1, in which said anchoring cross bar is provided at one side of the cable with a longitudinal slot for receiving said lever, the portion of the bar at the opposite side of the cable being tubular, and said cable extends into the bar through the inner end of said slot and then laterally into said tubular portion, the cable being anchored in said tubular portion of the bar.

5. A safety line according to claim 1, in which said anchoring cross bar is tubular at one side of the cable and is provided with a lateral opening in its central portion, and the cable extends into said opening and is anchored in the tubular portion of the bar.

6. A safety line according to claim 1, in which said slide is a manually movable sleeve.

References Cited

UNITED STATES PATENTS 1,749,462   3/1930   Behnke.

FOREIGN PATENTS 182,293   7/1922   Great Britain.

BERNARD A. GELAK, *Primary Examiner.*